(12) United States Patent
Ha et al.

(10) Patent No.: US 11,297,974 B2
(45) Date of Patent: Apr. 12, 2022

(54) PROTECTIVE FLOW-DIVERSION COVER FOR RISER TUBE, RISER TUBE ASSEMBLY AND BEVERAGE MAKING DEVICE

(71) Applicant: Keyway Innovations (Shanghai) Company Limited, Shanghai (CN)

(72) Inventors: Wan Kei Ricky Ha, Shanghai (CN); Karen Wai Wan, Shanghai (CN)

(73) Assignee: Keyway Innovations (Shanghai) Company Limited, Shanghai (CN)

( * ) Notice: Subject to any disclaimer, the term of this patent is extended or adjusted under 35 U.S.C. 154(b) by 434 days.

(21) Appl. No.: 16/386,425

(22) Filed: Apr. 17, 2019

(65) Prior Publication Data

US 2019/0313838 A1 Oct. 17, 2019

(30) Foreign Application Priority Data

Apr. 17, 2018 (CN) .......................... 201810345149.1

(51) Int. Cl.
| | |
|---|---|
| *A47J 31/057* | (2006.01) |
| *A47J 31/44* | (2006.01) |
| *A47J 31/46* | (2006.01) |
| *A47J 31/04* | (2006.01) |

(52) U.S. Cl.
CPC .......... *A47J 31/4407* (2013.01); *A47J 31/04* (2013.01); *A47J 31/057* (2013.01); *A47J 31/467* (2013.01); *A47J 31/468* (2018.08)

(58) Field of Classification Search
CPC ........ A47J 31/04; A47J 31/043; A47J 31/057; A47J 31/0573; A47J 31/0576

USPC .......................................................... 99/307
See application file for complete search history.

(56) References Cited

U.S. PATENT DOCUMENTS

| | | | | |
|---|---|---|---|---|
| 4,473,003 A | * | 9/1984 | Stone, Jr. ............... | A47J 31/465 99/285 |
| 2004/0118299 A1 | * | 6/2004 | Garman ................ | A47J 31/057 99/323.3 |
| 2012/0199009 A1 | * | 8/2012 | Zogg ...................... | A47J 31/469 99/283 |
| 2015/0182063 A1 | * | 7/2015 | Mills ....................... | A47J 31/46 99/283 |
| 2016/0235245 A1 | * | 8/2016 | Hanes ................. | A47J 31/3676 |

FOREIGN PATENT DOCUMENTS

WO WO-2016025992 A1 * 2/2016 .......... A47J 31/0573

* cited by examiner

*Primary Examiner* — Reginald Alexander
(74) *Attorney, Agent, or Firm* — Michael J. Brown (57) ABSTRACT

The present disclosure relates to a beverage making device, which includes a lid, a container, an infuser and a pump for pumping liquid. The pump pumps liquid in the container to the infuser through the riser tube. A protective flow-diversion cover is sleeved over a top end of the riser tube, and the protective flow-diversion cover is provided with a water outlet. The lid of the beverage making device is provided with a protruding member extending downward. Only when the lid is closed, the protective flow-diversion cover can open the water outlet by being triggered by the protruding part. This ensures that no liquid will be ejected from the beverage making device when the lid is opened.

10 Claims, 8 Drawing Sheets

PROTECTIVE FLOW-DIVERSION COVER FOR RISER TUBE, RISER TUBE ASSEMBLY AND BEVERAGE MAKING DEVICE

TECHNICAL FIELD

The present disclosure relates to a beverage making device, and in particular a protective flow-diversion cover for riser tube, a riser tube assembly including the protective flow-diversion cover and a beverage making device.

BACKGROUND

In the process of brewing beverages using an automatic beverage making device, it is usually necessary to pump the liquid up from the bottom using a pumping device. If the lid is not completely covered, the liquid can easily be ejected from the beverage making device and will splash onto the operator or contaminate the surrounding environment. Even worse, since many beverage making devices have heating function, hot fluid ejected in this situation may further cause scalding.

CN104161462B is a Chinese invention patent owned by the present applicant, which discloses an anti-scalding device for a beverage making device. The beverage making device mainly includes a container, an infuser located at the top of the container, and a heater located at the lower part of the container. An air compressor, a riser tube assembly, and a recessed cavity together form a pumping device that delivers the cold or heated liquid in the container to the infuser via the riser tube. An anti-scalding sensor is installed in the infuser and the lid of the beverage making device for detecting whether the lid of the beverage making device is opened. A controller of the beverage making device obtains signals from the anti-scalding sensor. If it receives a signal of the lid being opened, it will stop the operation of the pumping device. The riser tube that delivers liquid to the infuser will then no longer eject liquid. As a result, the anti-scalding device serves a protective purpose.

However, the anti-scalding sensor is an electronic device that is complicated to manufacture. It is prone to corrosion or aging when situated in a hot humid environment with varying acidity and alkalinity for an extended period of time. This results in a short lifespan and difficulty to service. In addition, if the brewing liquid is converged into one stream via the riser tube and then flows into the infuser, the dispersion area will be too concentrated. Therefore it is impossible to wet as much brewing ingredients within as little time as possible so that the ingredients can absorb water uniformly. Some very light brewing ingredients (such as herbal ingredients) can easily float on the liquid surface and cannot be fully soaked. For some powdery ingredients that are not instantly soluble, they may easily clump together and cannot dissolve well in the brewing liquid, thereby affecting the brewing results.

Therefore, there is a need in the art for a new device to solve the above problems, which not only can it realize flow diversion, but also increase the coverage of water dispersion in the infuser.

SUMMARY

The present disclosure aims to prevent liquid from ejecting out of a beverage making device during brewing while increasing the water spraying coverage of the riser tube all via a simple device.

To this end, the present disclosure provides a protective flow-diversion cover for a riser tube of a beverage making device. The beverage making device includes: a container for storing water or beverage; a removable lid that can attach to the container; an infuser for storing and brewing ingredients, and a pump for pumping liquid from the container to the infuser. The said pump pumps liquid in the container to the infuser through the riser tube, characterized in that the protective flow-diversion cover is sleeved over a top end of the riser tube. The protective flow-diversion cover is provided with a water outlet. The lid is provided with a protruding part extending downward, and the protruding part is configured to trigger opening or closing of the water outlet. When the lid is closed, the protruding part comes in contact the flow-diversion cover to open the water outlet. When the lid is opened, the protruding part moves away from the protective flow-diversion cover to close the water outlet.

In a preferred embodiment of the above protective flow-diversion cover for a riser tube, the protective flow-diversion cover is a hollow bladder structure that can be deformed, and the water outlet is a slit on a side face of the flow-diversion cover that faces the infuser.

In a preferred embodiment of the above protective flow-diversion cover for a riser tube, the protective flow-diversion cover is provided with an actuating part. When the lid is closed, the protruding part comes in contact with the actuating part, thereby triggering the water outlet to open.

In a preferred embodiment of the above protective flow-diversion cover for a riser tube, the actuating part is an elastic part. When the lid is closed, the protruding part comes in contact with the elastic part to open the water outlet. When the lid is opened, the protruding part moves away from the elastic part, and the water outlet is closed under the elastic force of the elastic part.

In a preferred embodiment of the above protective flow-diversion cover for a riser tube, the actuating part is a biased rotating part. When the lid is closed, the protruding part comes in contact with the biased rotating part, thereby opening the water outlet. When the lid is opened, the protruding part moves away from the biased rotating part, and the water outlet is closed under the action of the biasing force of the biased rotating part.

In a preferred embodiment of the above protective flow-diversion cover for a riser tube, the water outlet is a plurality of vertical slits positioned on a side wall of the protective flow-diversion cover. The plurality of vertical slits is naturally closed.

In a preferred embodiment of the above protective flow-diversion cover for a riser tube, the protruding part is a pressing block. When the lid is in a closed state, the pressing block presses the protective flow-diversion cover downwards, thereby opening the plurality of vertical slits.

In a preferred embodiment of the above protective flow-diversion cover for a riser tube, the protective flow-diversion cover is made of silicone rubber material. And/or the protective flow-diversion cover is provided with a fixture part for fixing the protective flow-diversion cover to the body of the container.

According to another aspect of the present disclosure, a riser tube assembly for a beverage making device is provided, where the riser tube assembly includes the above described riser tube and protective flow-diversion cover.

According to still another aspect of the present disclosure, a beverage making device is provided, where the beverage making device includes the above described protective flow-diversion cover for riser tube or the above described riser tube assembly.

Those skilled in the art can understand that the protective flow-diversion cover is a simple mechanical part which does not require circuit control, is resistant to high temperature and corrosion, and is easy to maintain and install. Moreover, the protective flow-diversion cover can be controlled to open or close the water outlet according to the opening/closing state of the lid merely by a simple triggering. It ensures that the liquid is pumped out of the riser tube only when the lid is closed, thereby realizing simple and direct protection. At the same time, the shape and the number of the slits on the protective flow-diversion cover can control the water discharge speed and the spraying coverage of the riser tube well, and solve the problem of insufficient soaking to some extent.

LIST OF REFERENCE NUMBERS IN THE FIGURES

1: beverage making device; 21: container; 211: inner bottom surface of the container; 24: infuser; 241: drainage port at the bottom of the infuser; 23: lid; 231: pressing block; 26: protective flow-diversion cover; 261: fixture part; 262: protective flow-diversion section; 263: vertical slit; 264: joining section; 25: riser tube; 27: recessed cavity; 22: handle; 221: handle fixture.

DETAILED DESCRIPTION

Figure 1:
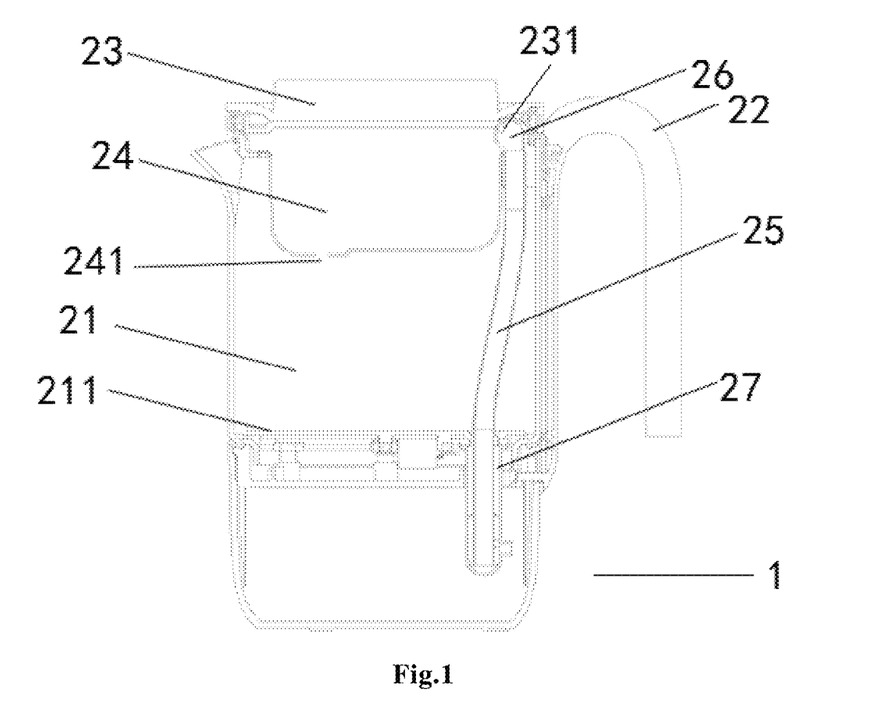
FIG. 1 is a vertical cross-sectional view of a beverage making device according to the present disclosure.
Figure 2:
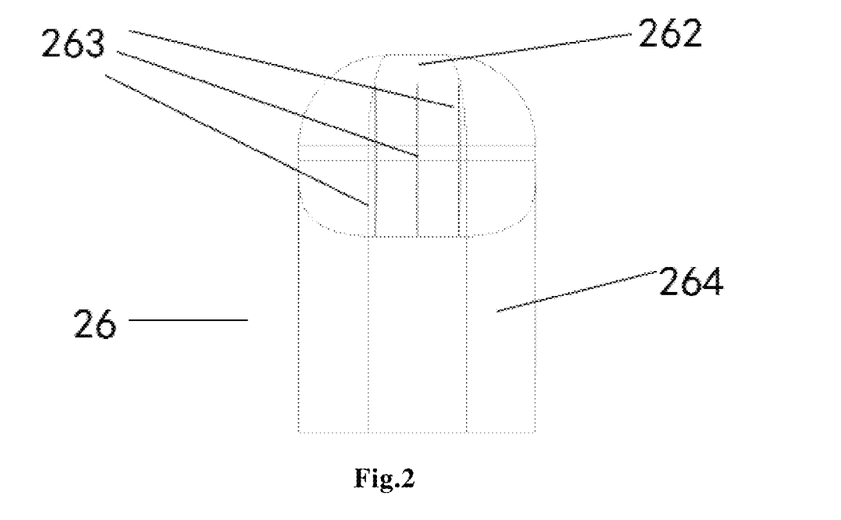
FIGS. 2, 3, 4 and 5 are enlarged perspective views of a protective flow-diversion cover according to the present disclosure.
Figure 3:
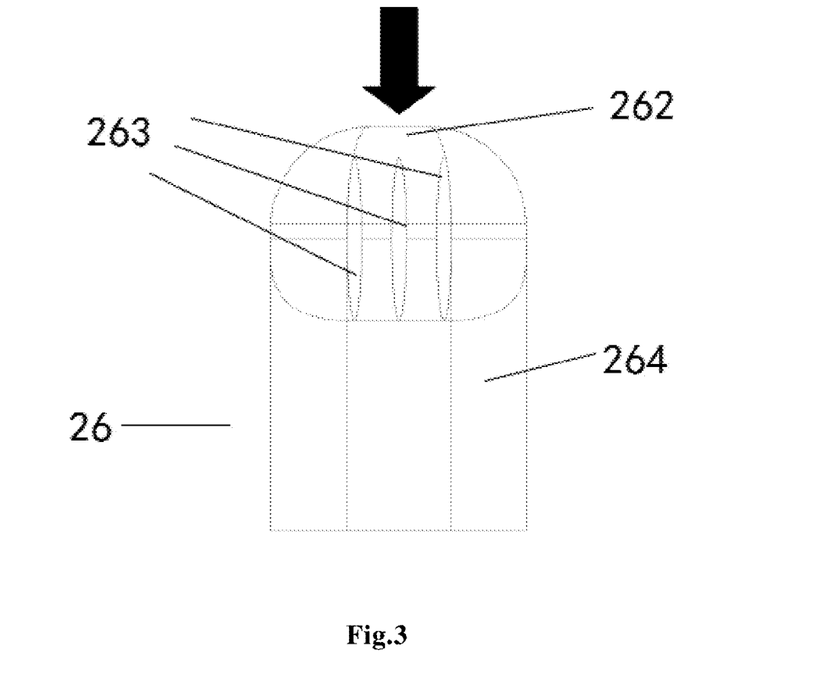
Figure 4:
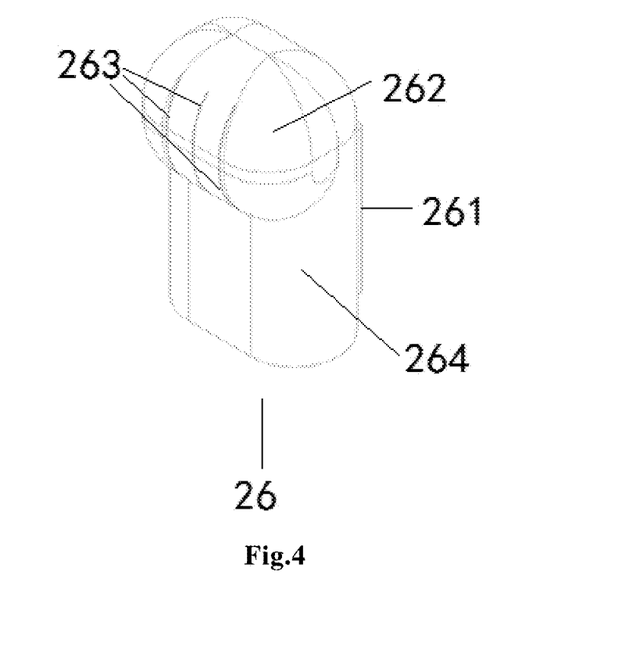
Figure 5:
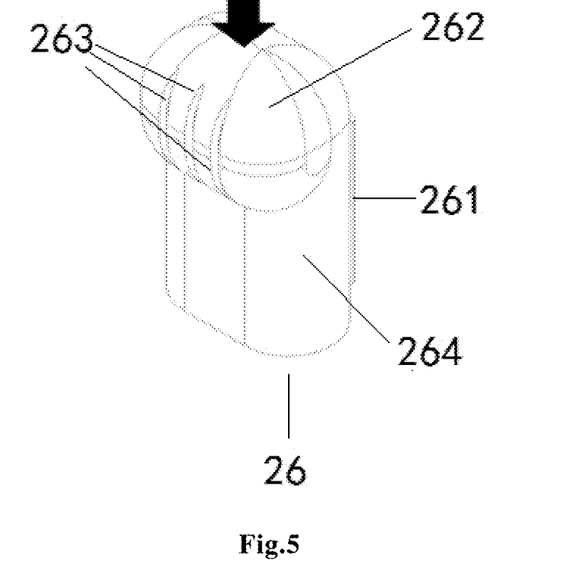

Hereinafter, a protective flow-diversion cover for riser tube of the present disclosure will be described in detail with reference to the accompanying drawings. Firstly, referring to FIGS. 1, 10 and 2, 3, 4, 5, the beverage making device 1 of the present disclosure includes a container 21 for storing water or beverage, a removable lid 23 that can attach to the container 21, an infuser 24 positioned in the container 21 for storing and brewing ingredients, and a pump (not shown) for pumping liquid from the container 21 to the infuser 24, wherein the pump pumps the liquid in the container 21 to the infuser 24 through a riser tube 25. The protective flow-diversion cover 26 of the present disclosure (to be described in detail below) is sleeved over a top end of the riser tube 25. A water outlet 263 (shown clearly in FIG. 2) is provided on a side wall of the protective flow-diversion cover 26 that faces the infuser 24. The cover 23 is provided with a downwardly extending pressing block 231 for triggering the opening or closing of the water outlet 263. Specifically, the position of the pressing block 231 is set such that when the lid 23 is closed, the pressing block 231 presses the flow-diversion cover 26 to open the water outlet 263, at which time the liquid can flow out of the water outlet 263. When the lid 23 is opened, the pressing block 231 moves away from the protective flow-diversion cover 26 and the water outlet 263 closes, thereby blocking the liquid rising along the riser tube 25. It should be understood by those skilled in the art that the beverage making device 1 of the present disclosure further includes a plurality of other components in addition to those described above. Since the technical solution of the present disclosure and its operation do not involve these other components, no discussion of them is given herein.

Preferably, the protective flow-diversion cover 26 is made of silicone rubber material, and includes a protective flow-diversion section 262 and a joining section 264. The protective flow-diversion section 262 has a hollow bladder structure. One side of the protective flow-diversion section 262 that faces the infuser 24 protrudes from the joining section 264. Three vertical slits 263 are situated on a side face of the protective flow-diversion section 262 that faces the infuser 24 as water outlets. In a natural state, the vertical slits 263 are in a closed state. Deformation occurs when the top of the protective flow-diversion section 262 is pressed, causing the vertical slits 263 to open. As seen from FIG. 1, pressure is applied to the top of the protective flow-diversion section 262 by the pressing block 231 on the lid 23. The pressing block 231 presses the protective flow-diversion section 262 only when the lid 23 is closed. Therefore, only when the lid is closed, the liquid rising along the riser tube 25 can be ejected from the protective flow-diversion cover 26, thereby providing good protection. The joining section 264 is sleeved over the top end of the riser tube 25 so that the protective flow-diversion cover 26 is joined to the riser tube 25. A side wall of the joining section 264 that faces away from the vertical slits 263 is further provided with a fixture part 261 for fixing the protective flow-diversion cover 26 to the body of the container 21.

The silicone rubber material for making the protective flow-diversion cover is convenient to get, is stable in chemical properties, and covers a wide range of working temperature ranging from low to high. It deforms under pressure and restores its form rapidly, and requires no electronic control. It is simple to manufacture, has a long lifetime, and is easy to install. Moreover, the three vertical slits 263 form three water outlets in different directions. The wide water coverage allows the ingredients to be uniformly wetted and absorb water as quickly as possible. This effectively prevents excessively light brewing ingredients (for example, herbal ingredients) from floating on the liquid surface, and powdery ingredients that do not dissolve easily from clumping, thereby enhancing the brewing effect.

It should be noted that although three vertical slits 263 are shown in the drawings and described herein, the number and shape of the above water outlets are not limiting, and different numbers and shapes may lead to different water discharge speeds and spraying coverage areas. Those skilled in the art can adjust the above number and specific shape as required. For example, the number of water outlets may be more or less than three, and the shape may be in other shapes other than vertical slits.

In addition, the protective flow-diversion cover 26 described herein is not limited to being made of silicone rubber material. In practical applications, it may also be made of other materials that can be deformed and resistant to high temperature and corrosion.

Furthermore, although the protective flow-diversion cover 26 described above opens and closes the water outlet by the elasticity of its own material, the present disclosure is not limited thereto. The water outlet can also be opened and closed by an external mechanism, as long as the mechanism can achieve the purpose of "opening the water outlet when closing the lid, and closing the water outlet when opening the lid". For example, the protective flow-diversion cover 26 may be provided with an elastic actuating part, such as a spring, and a sliding shut-off gate may be disposed on the water outlet. In the absence of an external force, the sliding shut-off gate closes the water outlet under the action of the elastic force of the spring. When the lid 23 is closed, the pressing block 231 comes in contact with the sliding shut-off gate in a direction against the elastic force, thereby opening the water outlet. When the lid 23 is opened, the pressing block 231 moves away from the sliding shut-off gate, and the water outlet is closed again by the sliding shut-off gate under the action of the elastic force of the spring. In another example, the protective flow-diversion cover 26 may be provided with a biased rotating part such as a rotating shaft assembly with a torsion spring, and a pivoting shut-off gate may be positioned on the water outlet. In the absence of an external force, the pivoting shut-off gate closes the water outlet under the action of the torsion spring. When the lid 23 is closed, the pressing block 231 comes in contact with the pivoting shut-off gate in a direction against the action force of the torsion spring, thereby opening the water outlet. When the lid 23 is opened, the pressing block 231 moves away from the pivoting shut-off gate, and the water outlet is closed again by the pivoting shut-off gate under the action of the torsion spring. Of course, in the above two examples, the protective flow-diversion cover 26 is preferably made of a rigid material.

Figure 6:
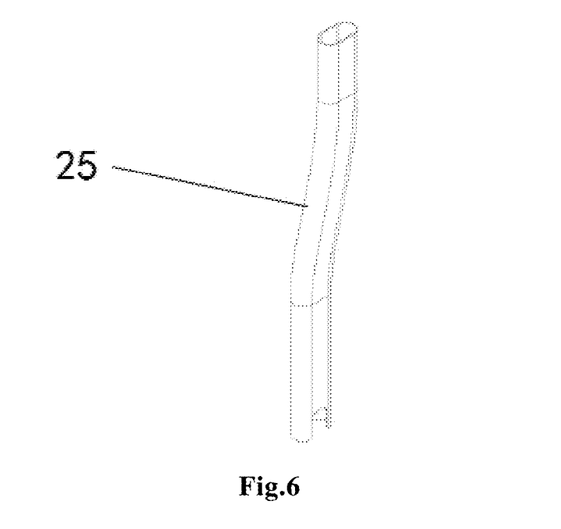
FIG. 6 is a perspective view of a riser tube according to the present disclosure.
Figure 7:
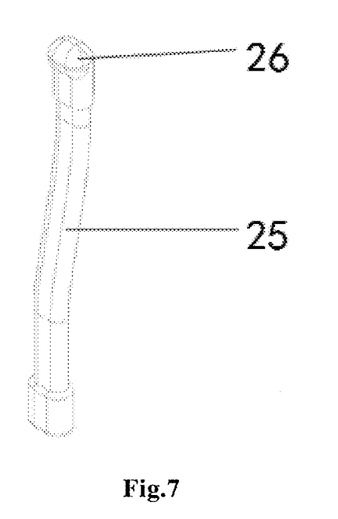
FIGS. 7 and 8 are perspective views of a riser tube assembly according to the present disclosure when viewed from different angles, showing the assembled protective flow-diversion cover of the present disclosure.
Figure 8:
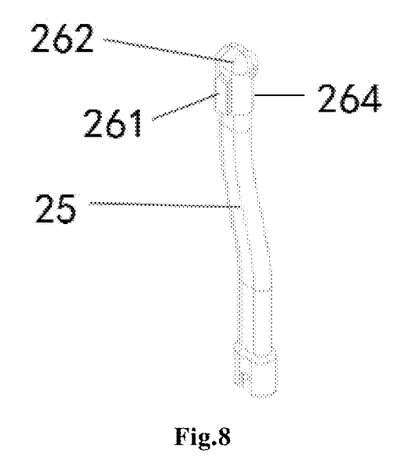
Figure 9:
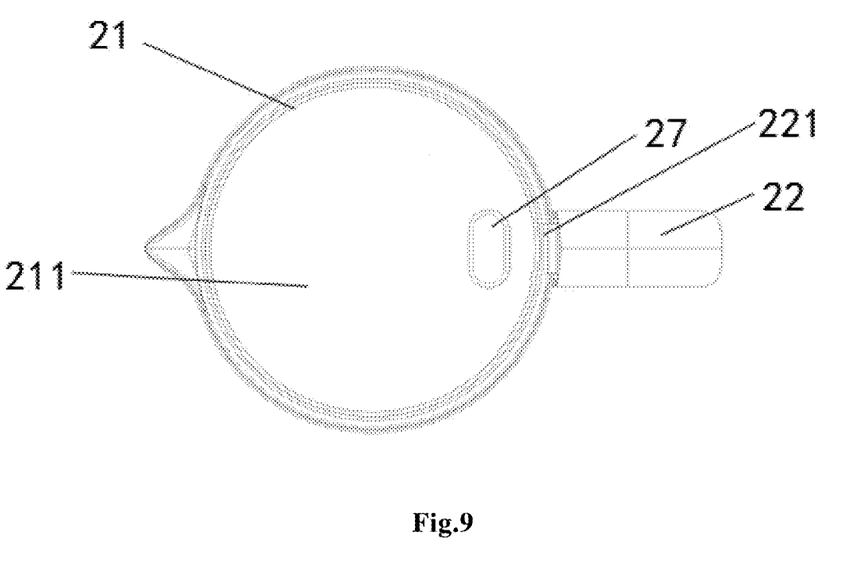
FIG. 9 is a top view of a beverage making device according to the present disclosure, with the lid, infuser and riser tube assembly of the present disclosure removed.
Figure 10:
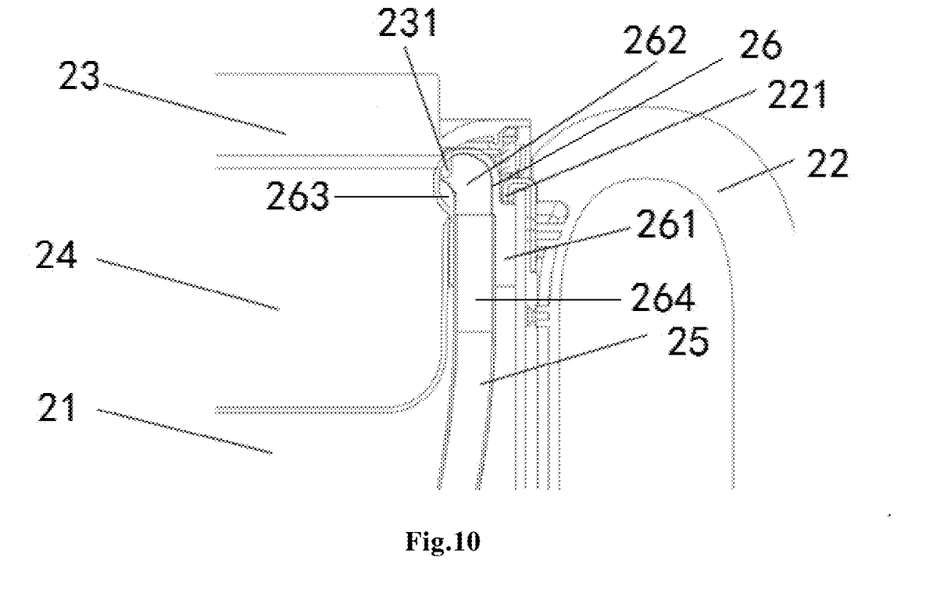
FIG. 10 is a partially enlarged view of a beverage making device according to the present disclosure, showing the assembled protective flow-diversion cover of the present disclosure.
Figure 11:
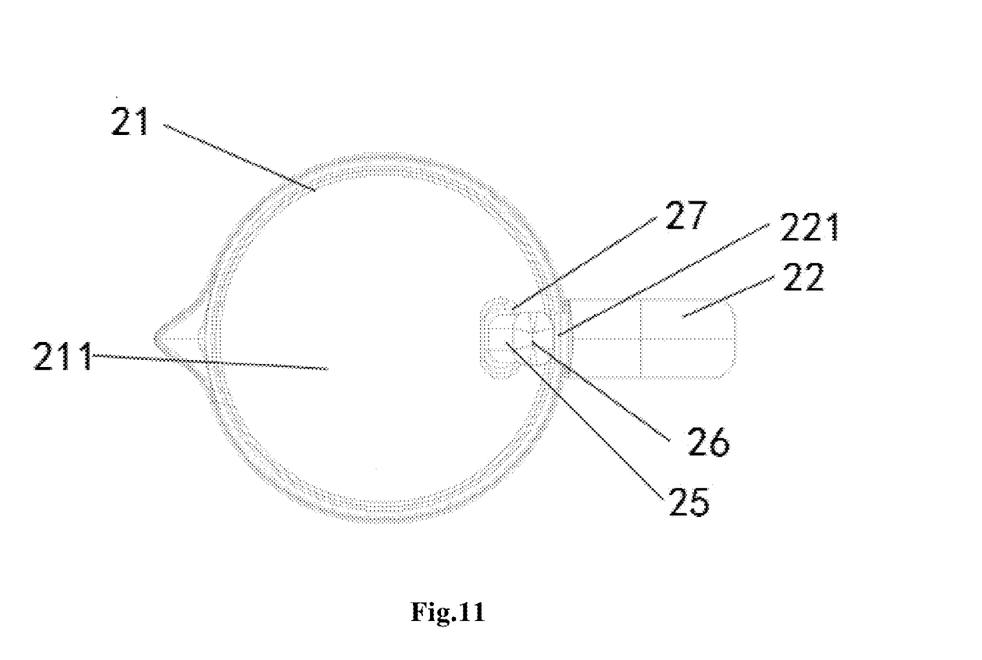
FIG. 11 is a top view of a beverage making device according to the present disclosure, with both the lid and infuser removed.
Figure 12:
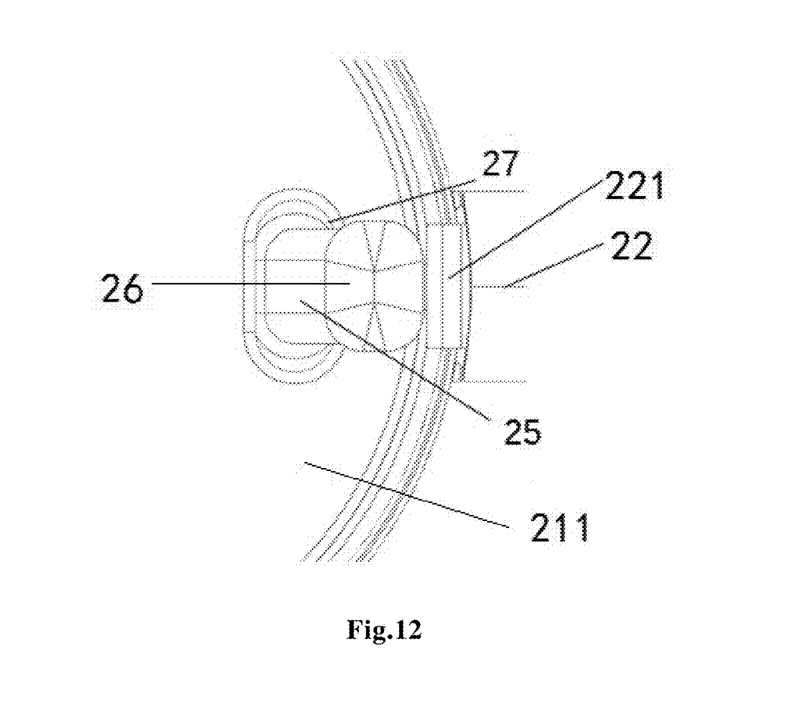
FIG. 12 is a partially enlarged view of FIG. 11.
Figure 13:
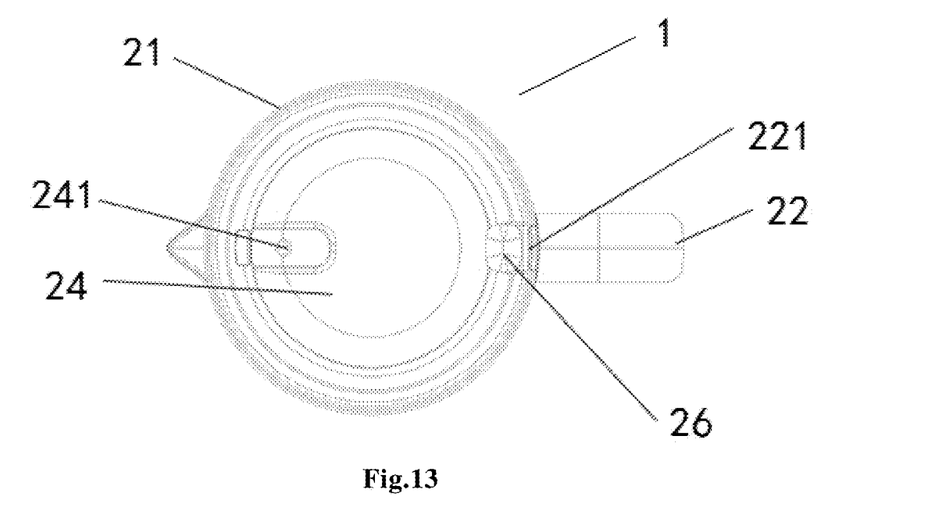
FIG. 13 is a top view of a beverage making device according to the present disclosure, with the lid removed.
Figure 14:
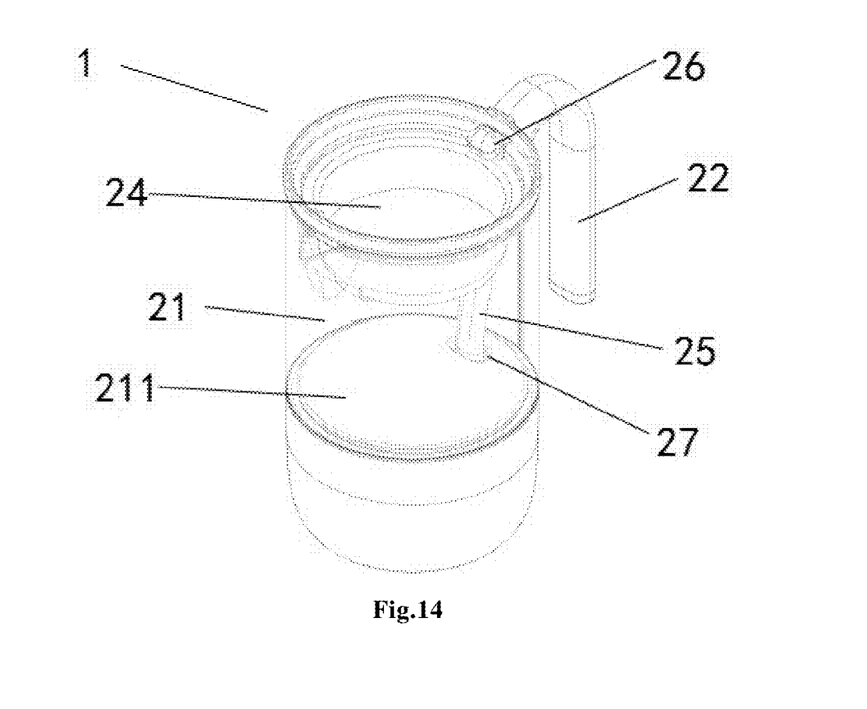
FIG. 14 is a perspective view of a beverage making device according to the present disclosure.

FIGS. 6, 7 and 8 show the assembled state of the protective flow-diversion cover 26 and the riser tube 25. The protective flow-diversion sleeve 26 is sleeved over the top end of the riser tube 25 through the joining section 264. In the assembled state, a side of the protective flow-diversion section 262 that protrudes from the joining section 264 faces the infuser 24, and a side that is provided with the fixture part 261 leans against the body of the container. The fixture part 261 on the joining section 264 can fix the riser tube 25 together to the body of the container.

In continued reference to FIGS. 9 to 14, a bottom end of the riser tube 25 is inserted into the recessed cavity 27 at the bottom 211 of the container. The fixture part 261 on the protective flow-diversion cover 26 fixes the protective flow-diversion cover 26 and the riser tube 25 together to the body of the container 21. Preferably, the fixture part 261 is directly inserted into a fixture part 221 of a handle 22 of the beverage making device. A side of the protective flow-diversion cover 26 that protrudes from the riser tube 25 faces the infuser 24, and the riser tube 25 at the lower section of the protective flow-diversion section 262 leans against the outer wall of the infuser 24. So the riser tube 25 and the protective flow-diversion cover 26 are stably fixed between the outer wall of the infuser 24 and the inner wall of the container 24. This prevents the riser tube 26 and the protective flow-diversion cover 26 from dispositioning during transportation of the beverage making device 1 or due to excessive impulsive force of the rising liquid during brewing. At the same time, the side wall of the protective flow-diversion section 262 that is provided with slits 263 (only one of which is representatively shown in FIG. 10) protrudes towards the infuser 24 and protrudes from the inner wall of the infuser 24. So the liquid completely flows into the infuser 24 when coming out of the slits 263 (only one of which is representatively shown in FIG. 10). Even if there is only a little liquid coming out, it will not flow back to the container 21 along the outer wall of the riser tube 25.

According to another aspect of the present disclosure, a riser tube assembly is further provided, which includes the above described riser tube 25 and protective flow-diversion cover 26.

According to still another aspect of the present disclosure, a beverage making device is further provided, which includes the above described protective flow-diversion cover 26 or the above described riser tube assembly.

Figure 15:
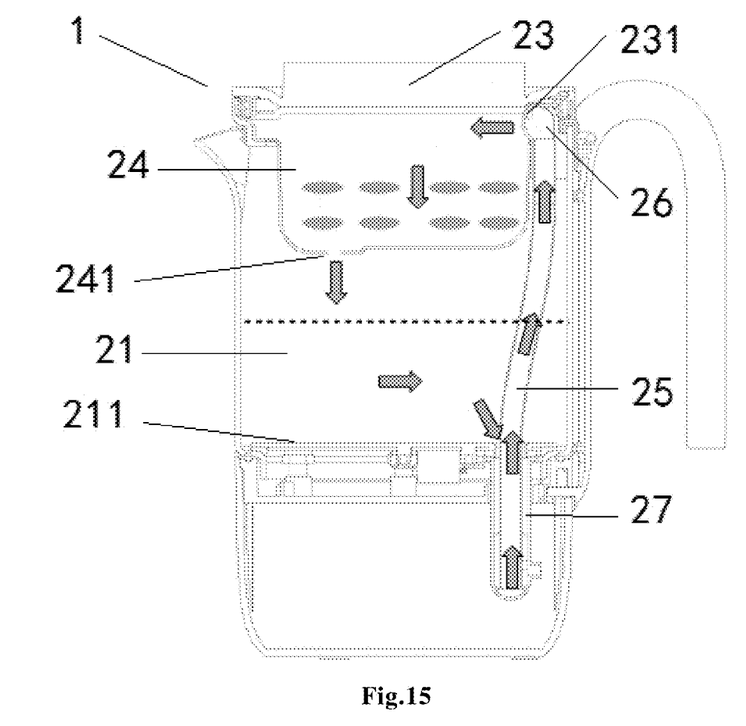
FIG. 15 is a flow diagram of the liquid in a beverage making device according to the present disclosure.

Finally, reference is made to FIG. 15, which shows a flow diagram of the liquid in the beverage making device 1 according to the present disclosure. In a state where the lid 23 is closed, the liquid in the container 21 enters the recessed cavity 27 at the inner bottom surface 211 of the container 21. After being pumped and pressurized in the recessed cavity 27, the liquid rises along the riser tube 25, enters the infuser 24 via the protective flow-diversion cover 26 that is sleeved over the top of the riser tube 25, and then returns to the container 24 via a drainage port 241 at the bottom of infuser 24 after the soaking is completed. The cycle is repeated in such a manner for dynamic brewing.

Heretofore, the technical solutions of the present disclosure have been described in conjunction with the preferred embodiments shown in the drawings. But it is obvious to those skilled in the art that the protection scope of the present disclosure is obviously not limited to these specific embodiments. Those skilled in the art can make equivalent changes or replacements to the related technical features without departing from the principle of the present disclosure. The technical solutions modified or replaced will fall within the protection scope of the present disclosure.

What is claimed is:

1. A protective flow-diversion cover for a riser tube of a beverage making device, the beverage making device comprising: a container for storing water or beverage; a removable lid that can attach to the container; an infuser for storing and brewing ingredients, and a pump for pumping liquid from the container to the infuser, wherein the pump pumps liquid in the container to the infuser through the riser tube,
   wherein the protective flow-diversion cover includes a protective flow-diversion section and a joining section, the protective flow-diversion section having a side wall which faces the infuser, protrudes from the joining section, and is provided with a water outlet thereon, the joining section being sleeved over a top end of the riser tube and having a side wall which faces away from the water outlet and is provided with a fixture part for fixing the protective flow-diversion cover to the container; and wherein the lid is provided with a protruding part extending downward, the protruding part being configured to trigger opening or closing of the water outlet;

when the lid is closed, the protruding part comes in contact with the flow-diversion cover to open the water outlet; and when the lid is opened, the protruding part moves away from the protective flow-diversion cover to close the water outlet.

2. The protective flow-diversion cover for a riser tube according to claim 1, wherein the protective flow-diversion cover is a hollow bladder structure that can be deformed, and the water outlet is a slit or slits on a side face of the flow-diversion cover that faces the infuser.

3. The protective flow-diversion cover for a riser tube according to claim 1, wherein the protective flow-diversion cover is provided with an actuating part, and when the lid is closed, the protruding part comes in contact with the actuating part, thereby triggering the water outlet to open.

4. The protective flow-diversion cover for a riser tube according to claim 3, wherein the actuating part is an elastic part: when the lid is closed, the protruding part comes in contact with the elastic part to open the water outlet; and when the lid is opened, the protruding part moves away from the elastic part, and the water outlet is closed under the elastic force of the elastic part.

5. The protective flow-diversion cover for a riser tube according to claim 3, wherein the actuating part is a biased rotating part: when the lid is closed, the protruding part comes in contact with the biased rotating part, thereby opening the water outlet; and when the lid is opened, the protruding part moves away from the biased rotating part, and the water outlet is closed under the action of the biasing force of the biased rotating part.

6. The protective flow-diversion cover for a riser tube according to claim 2, wherein the water outlet is a plurality of vertical slits disposed on a side wall of the protective flow-diversion cover, and the plurality of vertical slits are closed in a natural state.

7. The protective flow-diversion cover for a riser tube according to claim 6, wherein the protruding part is a pressing block, and when the lid is in a closed state, the pressing block presses the protective flow-diversion cover downwardly, thereby opening the plurality of vertical slits.

8. The protective flow-diversion cover for a riser tube according to claim 1, wherein the protective flow-diversion cover is made of silicone rubber material; and/or the protective flow-diversion cover is provided with a fixture part for fixing the protective flow-diversion cover to the body of the container.

9. A riser tube assembly for a beverage making device, wherein the riser tube assembly comprises the riser tube and the protective flow-diversion cover according to claim 1.

10. A beverage making device, comprising the riser tube assembly according to claim 9.

* * * * *